Figure 1:
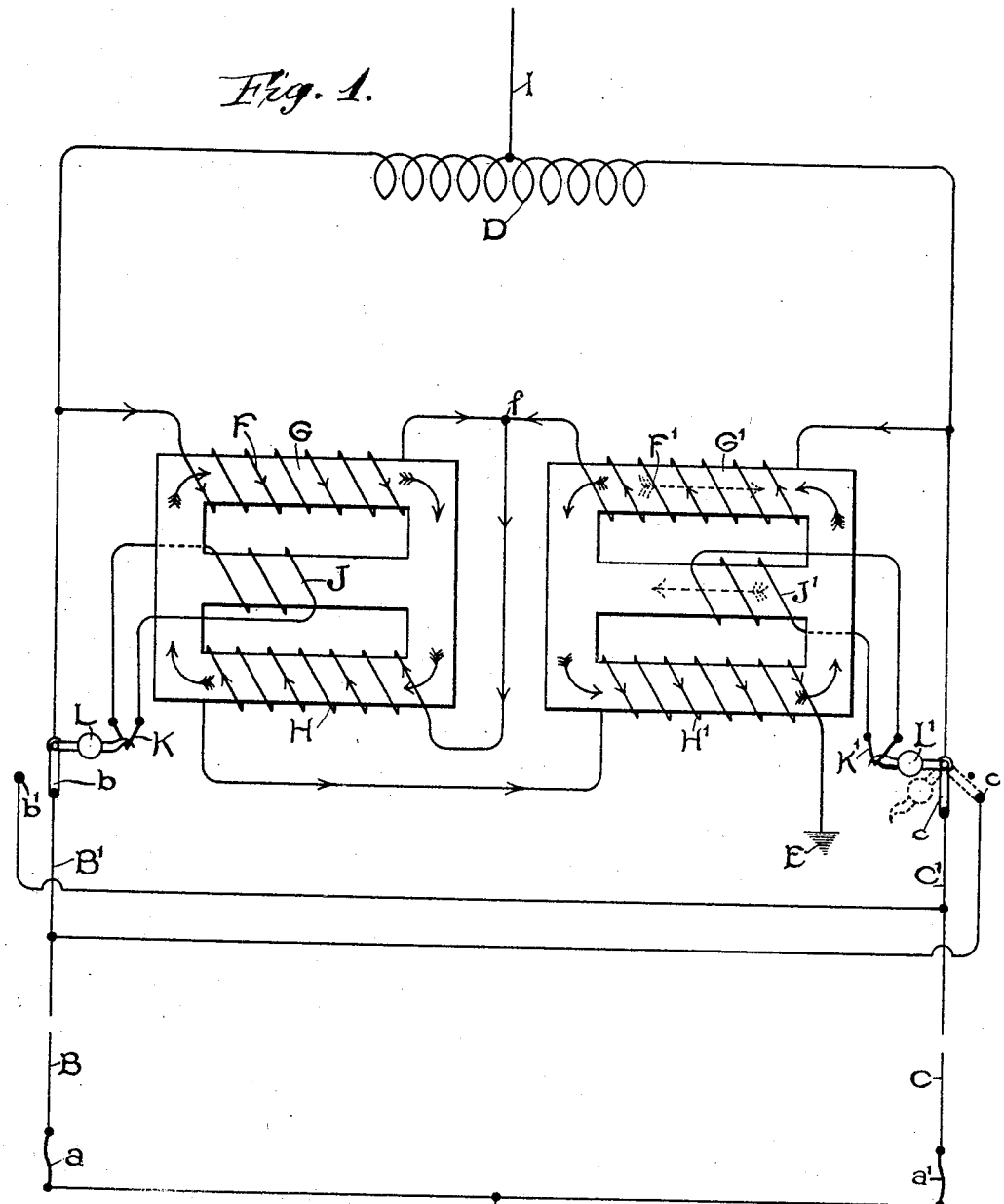

No. 771,891. PATENTED OCT. 11, 1904.
L. ANDREWS.
PROTECTIVE SYSTEM FOR ELECTRIC CONDUCTORS.
APPLICATION FILED APR. 15, 1903.
NO MODEL. 3 SHEETS—SHEET 1.

WITNESSES: INVENTOR.
L. A. Hawkins Leonard Andrews.
R. E. Haynes BY Richard Eyre
ATTORNEY.

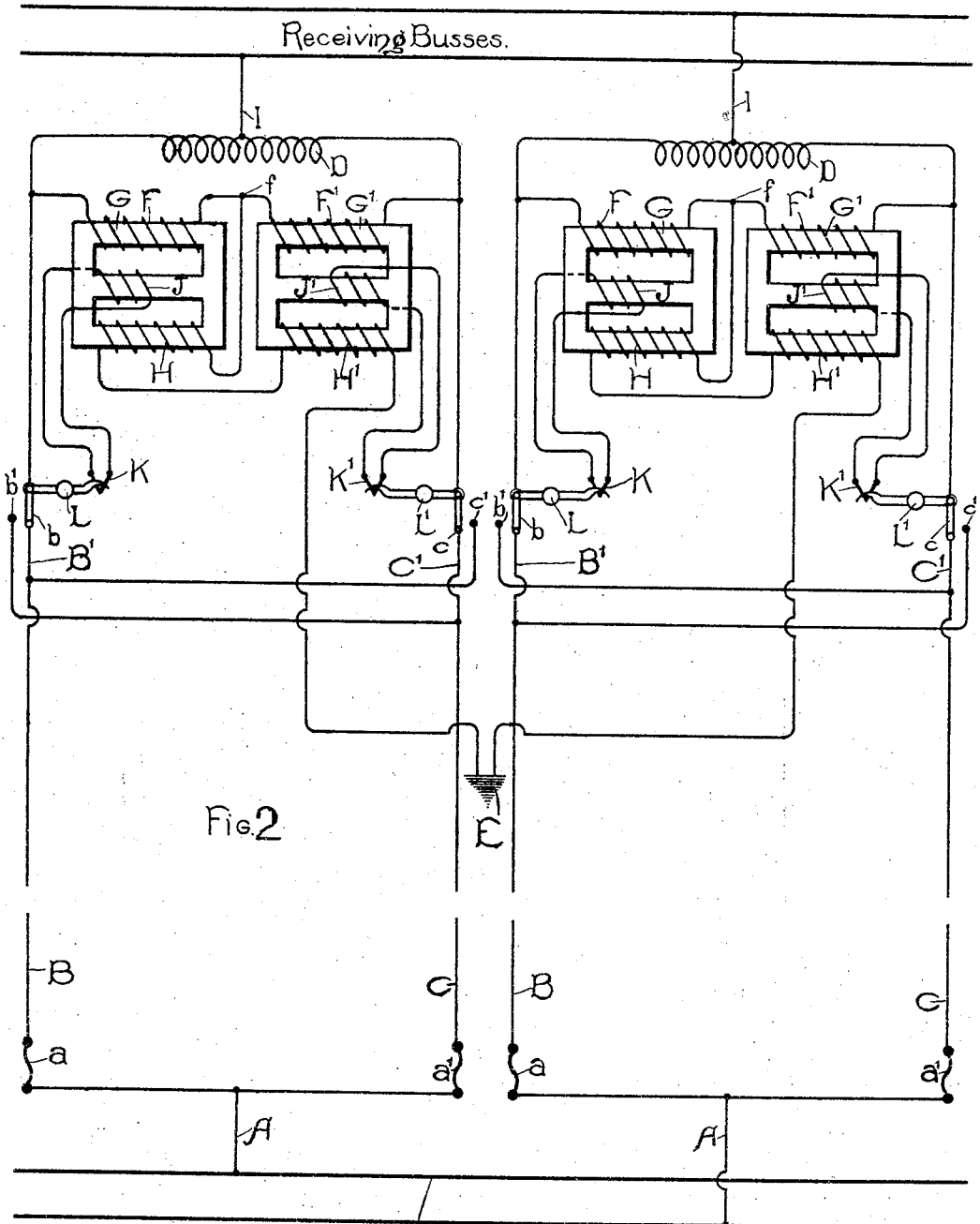

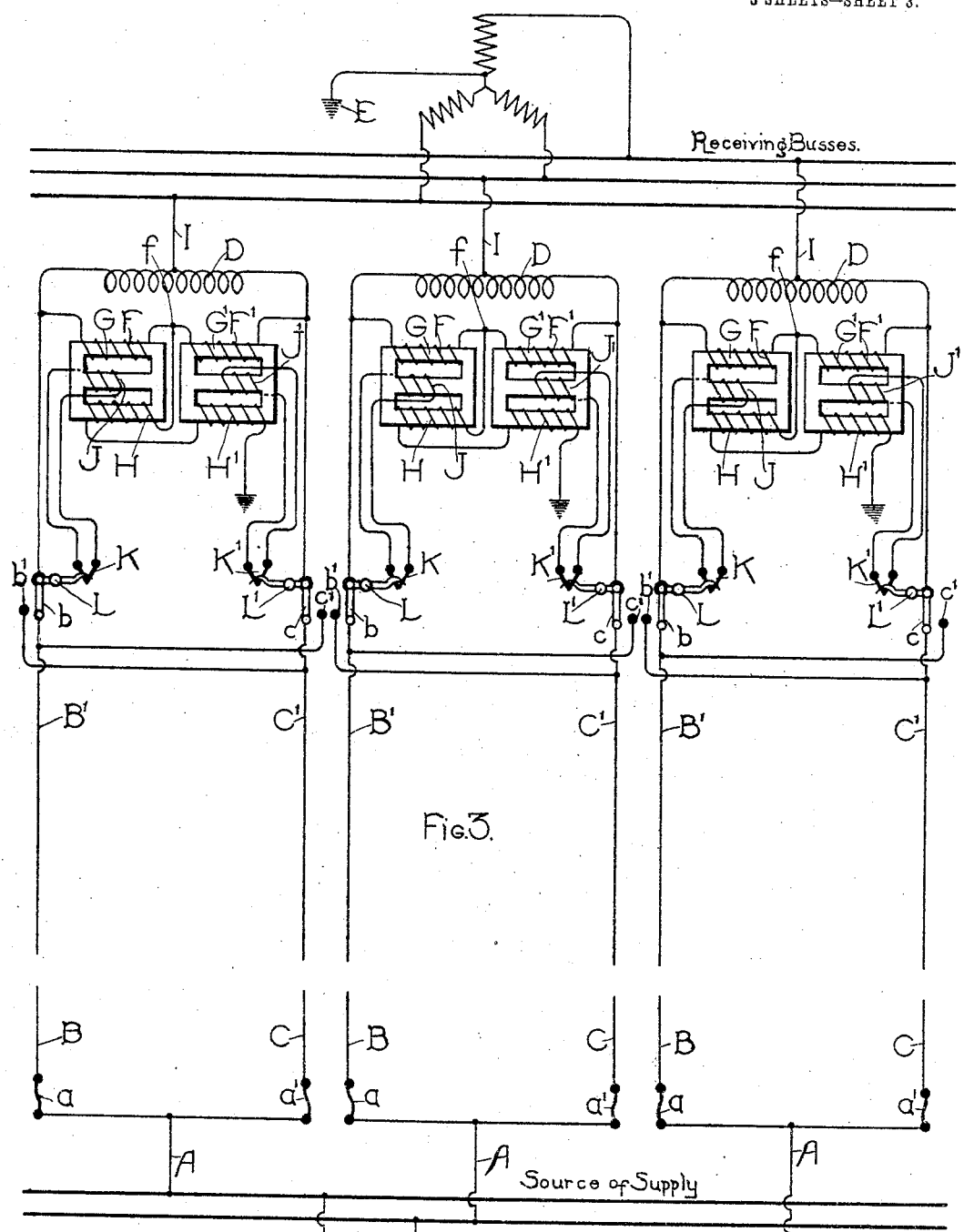

No. 771,891.

Patented October 11, 1904.

UNITED STATES PATENT OFFICE.

LEONARD ANDREWS, OF HASTINGS, ENGLAND, ASSIGNOR TO STANLEY ELECTRIC MANUFACTURING COMPANY, OF PITTSFIELD, MASSACHUSETTS, A CORPORATION OF NEW JERSEY.

PROTECTIVE SYSTEM FOR ELECTRIC CONDUCTORS.

SPECIFICATION forming part of Letters Patent No. 771,891, dated October 11, 1904.

Application filed April 15, 1903. Serial No. 152,666. (No model.)

*To all whom it may concern:*

Be it known that I, LEONARD ANDREWS, a subject of the King of England, and a resident of Hastings, England, have invented certain new and useful Improvements in Protective Systems for Electric Conductors, of which the following is a specification.

My invention relates to protective systems for alternating-current feeders of the kind described in Letters Patent No. 726,837, issued to me May 5, 1903; and it consists in improvements for protective devices for such systems. Where a number of feeders are connected together both at the generating and at the receiving ends, in case one of the feeders becomes short-circuited by a ground or by a connection to the opposite polarity of the system it is necessary for proper operation that the faulty feeder should be cut out at both ends, since, although it is disconnected from the generator bus-bars, current will flow through the healthy feeders and back through the faulty feeder from the receiving end to the ground or fault.

The object of my invention is to provide means for safeguarding such a system against a shut-down because of an accident to one feeder and for automatically and certainly cutting out such faulty feeder at both ends from the system.

In the accompanying drawings, Figure 1 shows a protective device arranged in accordance with my invention. Fig. 2 shows such a device applied to a single-phase ungrounded system. Fig. 3 shows such a device applied to a three-phase system having the neutral point grounded.

In Fig. 1, A represents a station bus-bar connected to one terminal of a station-transformer. (Not shown.) Bus-bar A is connected through fuses $a\ a'$ to the duplicate feeders B C. The receiving ends of the feeders are indicated at B' C', which are connected through switches $b\ c$ and through the differential choke-coil D to the substation or receiving bus-bar I. Feeders B' C' are connected by windings F F' of the "discriminating" transformers G G'. The point of connection $f$ of these two windings is connected through windings H H to earth E. Wound on the central cores of transformers G G' are the windings J J', which are short-circuited by fuses K K'. Supported by fuses K K' are the weighted levers L L', rigidly connected to switch-blades $b\ c$. $b'\ c'$ are extra switch-contacts, cross-connected to the opposite feeder.

The operation is as follows: Under normal conditions the feeders B and C divide the load, and since the current flows in opposite directions through the halves of the differential choke-coil D the fluxes oppose each other, and there is practically no drop of voltage in the choke-coil. If now one feeder, C, is short-circuited by a ground or otherwise, all the current is supplied by the healthy feeder B and flows through the choke-coil D in one direction. The choke-coil then acts inductively to choke back the rush of current from the healthy feeder B, so that the only effect of the short circuit is to blow fuse $a'$, leaving the fuse in the healthy feeder B intact; but although the faulty feeder C is open-circuited at the generating end by the blowing of fuse $a'$ choke-coil D will produce a detrimental voltage drop on bus-bar I. Consequently it is desirable that if feeder C becomes short-circuited or open-circuited choke-coil D should be cut out and have both ends connected to the same feeder. This is the function of the discriminating transformers G G'. From the connections of windings F F' and H H', as shown in Fig. 2, it is evident that normally current flows from both feeders through windings F F' to the point of connection $f$, thence through windings H H' in series to earth E, thence through windings H' and H in series of the transformers of the other polarity to the point of connection $f$ of windings F F' of the latter transformers, then through windings F F' in parallel to the feeders of the opposite polarity. Windings F and H and F' and H' are so wound relatively to each other that under normal conditions the fluxes induced thereby at any instant are in the same direction as indicated by the arrows in Fig.

1, the current at any instant in the windings being in the direction indicated by the arrowheads. It is evident that practically no flux will pass through the middle cores and that consequently no current will be generated in windings J J'. Now if feeder C becomes grounded the direction of current in windings F, H, and H' will remain the same, since current will still flow from healthy feeder B through these windings to earth and thence to the opposite polarity of the system. The current in winding F', however, will reverse, since feeder C by becoming grounded or short-circuited upon the feeders of opposite polarity has its potential lowered, and current consequently will flow from healthy feeder B through windings F F' to faulty feeder C. The potential across windings F F' in series is now equal to the potential drop across the terminals of differential choke-coil D, in both parts of which the current is now flowing in the same direction. Thus when the current in winding F' becomes reversed in direction relative to the other three windings F, H, and H' the flux in transformer G' at any instant is as indicated by the dotted arrows, practically all the flux passing through the central core, on which is mounted the secondary J'. Current is consequently generated in winding J', fuse K' melts, and weighted lever L' falls, throwing switch-blade c to contact c', as indicated by dotted lines. Thus feeder C is cut out at both ends, and both ends of choke-coil D are connected to feeder B. Current now flows through the two parts of choke-coil D in opposite directions, and all inductive drop in choke-coil D is prevented. My invention thus secures continuity of service despite accidents to one of the feeders.

In Fig. 2 the apparatus that has been above described is shown applied to a single-phase system. The apparatus is shown on a smaller scale, and the arrows indicating directions of current and fluxes are omitted. The two leads from the two sets of windings H and H' are shown both connected to earth. It is evident that in this arrangement the two leads may be connected directly together, the earth connection being omitted.

In Fig. 3 my protective devices are shown applied to a three-phase system, having the neutral point grounded. In this arrangement the leads from the windings H and H' in each case are connected directly to earth.

Although I have shown switches operated by fuses K K', it is evident that any well-known form of tripping device may be used to operate the switches. Moreover, different forms of magnetic cores may be employed, the only requisite being that the cores shall be so arranged that when the current in the two windings is in the same relative direction one part of the core shall not be traversed by a flux, while the relative reversal of current in one of the two windings produces a flux in said part of the core. Accordingly I do not desire to limit myself to the particular construction and arrangement of parts here shown, since changes therein which do not depart from the spirit of my invention and which are within the scope of the appended claims will be obvious to those skilled in the art.

Having fully described my invention, I claim as new and desire to protect by Letters Patent—

1. In combination, duplicate feeders, a differential choke-coil connected to said feeders, a magnetic core, two windings connected to said feeders and adapted to assist each other in producing a flux in a portion of said core only upon the unbalancing of current-flow in said choke-coil, one of said windings being connected to the opposite polarity of the system, a secondary coil mounted upon said portion of said core, and a switch arranged to be operated upon the passage of current through said secondary coil.

2. In combination, duplicate feeders, a differential choke-coil connected to said feeders, magnetic cores equal in number to said feeders, two windings for each core connected to said feeders and adapted to assist each other in producing a flux in a portion of said core only upon the unbalancing of current-flow in said choke-coil, one of said windings being connected to the opposite polarity of the system, a secondary winding upon said portion of each core, and a switch in the circuit of each feeder adapted to be operated upon the passage of current through said secondary coils.

3. In an alternating-current system of distribution, two feeders of similar polarity, a differential choke-coil connecting the ends of said feeders, two transformers having primary coils connected in series and shunting said choke-coil, two auxiliary primary coils for said transformers connected in series between the junction of the first-named primary coils and a point in electrical connection with the opposite polarity of the system, two secondary coils for said transformers so disposed with relation to the primary coils as to be traversed by practically no magnetic flux when the currents in said primary coils are relatively in the same direction, and to be traversed by a flux when the current in one of said primary coils is relatively reversed, and two switches adapted to be operated by the passage of current through said secondary coils and each switch being arranged to transfer an end connection of said choke-coil from one of said feeders to the other.

4. In an alternating-current system of distribution having a grounded neutral point, two feeders of similar polarity, a differential choke-coil connecting the ends of said feeders, two transformers having primary coils connected in series and shunting said choke-coil, two auxiliary primary coils for said transformers connected in series between the junction of the first-named primary coils and earth, two secondary coils for said transformers so disposed with relation to the primary coils as to be traversed by practically no magnetic flux when the currents in said primary coils are relatively in the same direction, and to be traversed by a flux when the current in one of said primary coils is relatively reversed, and switches adapted to be operated by the passage of current through said secondary coils and each switch being arranged to transfer an end connection of said choke-coil from one of said feeders to the other.

5. In combination, a transformer having two primary windings and one secondary winding, said secondary winding being so disposed relatively to said primary coils that it is traversed by practically no magnetic flux when the currents in the primary windings are relatively in the same direction, and to be traversed by a flux when the current in one of said primary coils is relatively reversed, a fuse short-circuiting said secondary winding, and a switch adapted to be operated by the melting of said fuse.

6. In combination, a plurality of feeders, a transformer connected to each feeder and having two primary windings and one secondary winding, said secondary winding being so disposed relatively to said primary windings that it is traversed by practically no magnetic flux when the currents through said primary windings are relatively in the same direction, and to be traversed by a flux when the current in one of said primary coils is relatively reversed, a fuse short-circuiting said secondary winding, and a switch adapted to be operated by the melting of said fuse and to open the circuit of said feeder.

7. In an alternating-current system of distribution, a plurality of feeders of the same polarity, a transformer for each feeder having one primary winding connected at one end to said feeder and at the other in electrical connection with another of said feeders and with a point electrically connected to the opposite polarity of said system, a second primary winding for said transformer in electrical connection at one end with said first feeder and with another of said feeders, and at the other end with a point electrically connected to the opposite polarity of said system, a secondary winding for said transformer so disposed in relation to said primary windings as to be traversed by a magnetic flux only when the currents in said primary windings are in relatively opposite directions and a switch adapted to be operated by passage of current through said secondary winding.

8. In an alternating-current system of distribution having the neutral point grounded, a plurality of feeders of the same polarity, a transformer for each feeder having one primary winding connected at one end to said feeder and at the other end in electrical connection with another of said feeders and with earth, a second primary winding for said transformer at one end in electrical connection with said feeder and with another of said feeders and at the other end with earth, a secondary winding for said transformer so disposed relatively to said primary windings as to be traversed by a magnetic flux only when the currents in the said primaries are in relatively opposite directions, and a switch adapted to be operated by the passage of current through said secondary winding.

Signed at 75 to 77 Cornhill, London, this 31st day of March, 1903.

LEONARD ANDREWS.

Witnesses:
  PERCY E. MATTOCKS,
  FRED. C. SMITH.